(12) United States Patent  
Carver et al.

(10) Patent No.: US 8,706,900 B2
(45) Date of Patent: Apr. 22, 2014

(54) DYNAMIC STORAGE RESOURCES

(75) Inventors: David C. Carver, Lexington, MA (US); Branko J. Gerovac, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 999 days.

(21) Appl. No.: 12/170,787

(22) Filed: Jul. 10, 2008

(65) Prior Publication Data

US 2010/0011145 A1 Jan. 14, 2010

(51) Int. Cl.
G06F 15/16 (2006.01)
G06F 3/00 (2006.01)
G06F 5/00 (2006.01)

(52) U.S. Cl.
USPC ............. 709/234; 709/203; 709/224; 710/52; 710/53; 710/56

(58) Field of Classification Search
USPC .................................. 709/203, 224, 227, 228
See application file for complete search history.

(56) References Cited

U.S. PATENT DOCUMENTS

| | | | |
|---|---|---|---|
| 3,746,780 A | 7/1973 | Stetten et al. | |
| 3,851,104 A | 11/1974 | Willard et al. | |
| 4,845,658 A | 7/1989 | Gifford | |
| 5,132,992 A | 7/1992 | Yurt et al. | |
| 5,371,870 A * | 12/1994 | Goodwin et al. | 710/52 |
| 5,581,552 A | 12/1996 | Civanlar et al. | |
| 5,581,784 A | 12/1996 | Tobagi et al. | |
| 5,583,995 A | 12/1996 | Gardner et al. | |
| 5,586,294 A * | 12/1996 | Goodwin et al. | 711/137 |
| 5,608,448 A | 3/1997 | Smoral et al. | |
| 5,625,778 A * | 4/1997 | Childers et al. | 710/107 |
| 5,640,563 A | 6/1997 | Carmon | |
| 5,787,482 A | 7/1998 | Chen et al. | |
| 5,805,804 A | 9/1998 | Laursen et al. | |
| 5,862,312 A | 1/1999 | Mann et al. | |
| 5,926,649 A | 7/1999 | Ma et al. | |
| 6,125,469 A * | 9/2000 | Zook et al. | 714/769 |
| 6,212,590 B1 * | 4/2001 | Melo et al. | 710/119 |
| 6,230,200 B1 * | 5/2001 | Forecast et al. | 709/226 |
| 6,263,411 B1 * | 7/2001 | Kamel et al. | 711/167 |

(Continued)

FOREIGN PATENT DOCUMENTS

| | | |
|---|---|---|
| WO | WO 2008/137334 | 11/2008 |
| WO | WO 2010/006127 | 1/2010 |
| WO | WO 2010/006132 | 1/2010 |
| WO | WO 2010/006134 | 1/2010 |

OTHER PUBLICATIONS

U.S. Appl. No. 11/744,394, filed May 4, 2007.
Office Action dated May 7, 2010 from U.S. Appl. No. 12/170,769.

(Continued)

Primary Examiner — Backhean Tiv
(74) Attorney, Agent, or Firm — Harrity & Harrity, LLP

(57) ABSTRACT

A storage server in a distributed content storage and access system provides a mechanism for dynamically establishing storage resources, such as buffers, with specified semantic models. For example, the semantic models support distributed control of single buffering and double buffering during a content transfer that makes use of the buffer for intermediate storage. In some examples, a method includes examining characteristics associated with a desired transfer of data, such as a unit of content, and then selecting characteristics of a first storage resource based on results of the examining. The desired transfer of the data is then affected to use the first storage resource element.

18 Claims, 6 Drawing Sheets

Write Buffer

(56) References Cited

U.S. PATENT DOCUMENTS

| | | | |
|---|---|---|---|
| 6,279,087 B1* | 8/2001 | Melo et al. | 711/146 |
| 6,374,336 B1 | 4/2002 | Peters et al. | |
| 6,401,126 B1 | 6/2002 | Douceur et al. | |
| 6,438,651 B1* | 8/2002 | Slane | 711/118 |
| 6,516,350 B1* | 2/2003 | Lumelsky et al. | 709/226 |
| 6,609,149 B1 | 8/2003 | Bandera et al. | |
| 6,886,035 B2* | 4/2005 | Wolff | 709/219 |
| 7,058,065 B2* | 6/2006 | Musoll et al. | 370/395.7 |
| 7,058,947 B1 | 6/2006 | Raja et al. | |
| 7,277,978 B2 | 10/2007 | Khatami et al. | |
| 7,421,437 B2* | 9/2008 | Hoeft et al. | 1/1 |
| 7,644,414 B2* | 1/2010 | Smith et al. | 719/328 |
| 7,805,551 B2* | 9/2010 | Wang et al. | 710/52 |
| 2002/0162047 A1* | 10/2002 | Peters et al. | 714/5 |
| 2003/0005457 A1 | 1/2003 | Faibish et al. | |
| 2003/0140051 A1 | 7/2003 | Fujiwara et al. | |
| 2003/0195948 A1 | 10/2003 | Takao et al. | |
| 2004/0103437 A1 | 5/2004 | Allegrezza et al. | |
| 2004/0198386 A1 | 10/2004 | Dupray | |
| 2005/0160139 A1* | 7/2005 | Boucher et al. | 709/203 |
| 2005/0181803 A1 | 8/2005 | Weaver et al. | |
| 2005/0262246 A1 | 11/2005 | Menon et al. | |
| 2006/0062555 A1 | 3/2006 | Zimmermann et al. | |
| 2006/0087990 A1 | 4/2006 | Kakivaya et al. | |
| 2006/0129676 A1* | 6/2006 | Modi et al. | 709/227 |
| 2006/0190552 A1 | 8/2006 | Henze et al. | |
| 2006/0259662 A1 | 11/2006 | Furukawa et al. | |
| 2006/0272015 A1 | 11/2006 | Frank et al. | |
| 2008/0109580 A1 | 5/2008 | Carlson et al. | |
| 2008/0126831 A1* | 5/2008 | Downey et al. | 714/4 |
| 2008/0244033 A1 | 10/2008 | Hook et al. | |
| 2008/0273540 A1 | 11/2008 | Gerovac et al. | |
| 2010/0010999 A1 | 1/2010 | Gerovac et al. | |
| 2010/0011002 A1 | 1/2010 | Gerovac et al. | |
| 2010/0011003 A1 | 1/2010 | Carver et al. | |
| 2010/0011091 A1 | 1/2010 | Carver et al. | |
| 2010/0011096 A1 | 1/2010 | Gerovac et al. | |
| 2010/0011145 A1* | 1/2010 | Carver et al. | 710/310 |
| 2010/0011364 A1 | 1/2010 | Gerovac et al. | |
| 2010/0011365 A1 | 1/2010 | Gerovac et al. | |

OTHER PUBLICATIONS

Restriction Requirement dated Jun. 10, 2010 from U.S. Appl. No. 12/170,624.
Chen et al.; "RAID: High-Performance, Reliable Secondary Storage;" AMC Computing Surveys, vol. 26, No. 2; DOI=http://doi.acm.org/10.1145/176979.176981; Jun. 1994; pp. 145-185.
Gal: "Algorithms and Data Structures for Flash Memories;" ACM Computing Surveys, vol. 37, No. 2; DOI=http://doi.acm.org/10.1145/1089733.1089735; Jun. 2005; pp. 138-163.
Ghandeharizadeh et al; "Continuous Display of Video Objects Using Multi-Zone Disks;" USC-CSE-94592; Apr. 12, 1995; 28 sheets.
Griwodz et al.; Long-term Movie Popularity Models in Video-on-Demand Systems or the Life on an on-Demand Movie; 5th ACM Int'l Conf. on Multimedia; DOI=http://doi/acm/org/10.1145/266180.266386; Nov. 9-13, 1997; pp. 349-357.
Little et al.; "Popularity-Based Assignment of Movies to Storage Devices in a Video-on-Demand System;" Multimedia Systems, vol. 2, No. 6; Jan. 1995; pp. 280-287.
Liu et al.; "Scheduling Algorithms for Multiprogramming in a Hard-Read-Time Environment;" Journal of the Association for Computing Machinery, vol. 20, No. 1; DOI=http://doi.acm.org/10.1145/321738.321743; Jan. 1973; pp. 46-61.
Mourad; "Issues in the design of a storage server for video-on-demand;" Multimedia Systems; vol. 4, No. 2; Apr. 1, 1996; XP008040912; pp. 70-86.
"NAND Flash Memories and Programming NAND Flash Memories Using ELNEC Device Programmers Application Note Version 2.01;" Sep. 2006, pp. 1-31.
Patterson et al.; "A case for Redundant Arrays of Inexpensive Disks (RAID); 1988 AC SIGMOD Int'l Conference on Management of Data;" DOI=http://doi.acm.org.10.1145/50202.50214; Jun. 1-3, 1988; pp. 109-116.
Pinheiro et al; "Failure Trends in a Large Disk Drive Population;" FAST '07: 5th USENIX Conference on File and Storage Techniques; Feb. 13-16, 2007; pp. 17-28.
Ruemmler et al.; "An Introduction to Disk Drive Modeling;" DOI=http://dx.doi.org/10.1109/2.268881; Mar. 1994; pp. 17-28.
Samsung Memory Division; NAND Flash ECC Algorithm 256B; Jun. 24, 2004; 8 sheets.
Samsung Memory Division; ECC Algorithm; 512B; Apr. 28, 2005; 8 sheets.
Samsung Memory Division; NAND Flash Spare Area Assignment Standard; Apr. 27, 2005; 5 sheets.
Schindler et al; "Automated Disk Drive Characterization;" Technical Report CMU-CS-99-176; Carnegie Mellon University; Dec. 1999; 21 sheets.
Schroeder et al.; "Disk Failures in the Real World; What Does an MTTF of 1,000,000 Hours Mean to You?;" FAST '05: 5th USENIX Conference on File and Storage Technologies; FAST '07; 2007; Feb. 14, 2007; pp. 1-16.
Sha et al.; "A Systematic Approach to Designing Distributed Real-Time Systems;" Computer vol. 26, No. 9; DOI=http://dx.doi.org/10.1109/2.231276; Sep. 1993; pp. 67-78.
Sinha et al.; "Intelligent Architectures for Managing Content;" Communications Technology Magazine; May 1, 2003; pp. 1-3.
Stoller et al; "Storage Replication and Layout in Vidio-on-Demand Servers;" 5th Int'l Workshop on Network and Operating System Support for Digital Audio and Video; Apr. 19-21, 1995; Eds. Lecture Notes in Computer Science, vol. 1018; pp. 330-341.
Stonebraker et al.; "Distributed RAID—A New Multiple Copy Algorithm;" 6th Int'l Conference on Data Engineering; IEEE Computer Society; Feb. 5-9, 1990; pp. 430-437.
Talagala et al; "2000 Microbenchmark-based Extraction of Local and Global Disk Characteristics;" UMI Order No. CSD-99-1063; University of California at Berkley; pp. 26.
Tetzlaff; "Elements of Scalable Video Servers;" 40th IEEE Computer Society Int'l Converence; COMPCON; Mar. 5-9, 1995; pp. 239-248.
Thouin et al.; "Video-on-Demand Networks; Design Approaches and Future Challenges;" IEEE Network—Special Issue on Convergence of Internet and Broadcasting Systems, vol. 22, No. 2; Mar. 2007; pp. 42-48.
To et al.; "Strategic Selection and Replication of Movies by Trend-Calibrated Movie-Demand Model;" 2000 Int'l Conference on Microelectronic Systems Education; MSE; Nov. 13, 2000; pp. 97-100.
Worthington et al; "On-Line Extraction of SCSI Disk Drive Parameters;" University of Michigan; Technical Report CSE-TR-323-96; Dec. 19, 1996; 46 sheets.
PCT Search Report of the ISA for PCT/US2008/061401 dated Jul. 1, 2008.
PCT Search Report and Written Opinion of the ISA for PCT/US2009/050051 dated Sep. 7, 2009.
PCT Search Report of the ISA for PCT/US2009/050057 dated Jan. 14, 2010.
Written Opinion of the ISA for PCT/US2009/050057 dated Jan. 14, 2010.
PCT International Preliminary Report of Patentability, date mailed Nov. 19, 2009, for PCT/US2008/061401.
Teorey, et al., "A Comparative Analysis of Disk Scheduling Policies", Communications of the ACM, v.15 n. 3, pp. 177-184, Mar. 1972.
Oney, "Queueing Analysis of the Scan Policy for Moving-Head Disks", Journal of the Association for Computing Machinery, vol. 22, No. 3, Jul. 1975, pp. 397-412.
Worthington, et al., "Scheduling for Modern Disk Drives and Non-Random Workloads", University of Michigan, Technical Report CSE-TR-194-94, Mar. 1, 1994.
Reddy, et al., Issues in a multimedia system, IEEE Computer Magazine 27, 3, pp. 69-74, Mar. 1994.
Zimmermann, "Continuous Media Placement and Scheduling in Heterogeneous Disk Storage Systems", Technical Report USC-99-699, 1999.
Shenoy, et al., "Cello: A Disk Scheduling Framework for Next Generation Operating Systems", Real-Time Syst. 22, 1-2, 9-48, Jan. 2002.

(56) References Cited

OTHER PUBLICATIONS

Goel, et al., "SCADDAR: An Efficient Randomized Technique to Reorganize Continuous Media Blocks", 18th International Conference on Data Engineering (ICDE 2002), San Jose, California, Feb. 26-Mar. 1, 2002.

Shahabi, et al., "Yima: A Second-Generation Continuous Media Server", IEEE Computer Magazine, pp. 56-64, Jun. 2002.

Androutsellis-Theotokis, et al., "A Survey of Peer-to-Peer Content Distribution Technologies", ACM Computing Surveys, vol. 36, No. 4, pp. 335-371, Dec. 2004.

Venugopal, et al., "A Taxonomy of Data Grids for Distributed Data Sharing, Management, and Processing", ACM Computing Surveys, vol. 38, No. 3, pp. 1-53, Mar. 2006.

Amazon, "Amazon S3 Developer Guide (API Version Mar. 1, 2006)", Internet, 2007.

Liskov, et al., "Providing Persistent Objects in Distributed Systems", Proceedings of the 13th European Conference on Object-Oriented Programming, Jun. 14-18, 1999.

Liskov, et al., "Transactional File Systems Can Be Fast", Proceedings of the 11th Workshop on ACM Sigops European Workshop: Beyond the PC, Sep. 19-22, 2004.

Braam, "File Systems for Clusters from a Protocol Perspective", Second Extreme Linux Topics Workshop, Monterey, Jun. 1999.

Hartman, et al., "The Zebra Striped Network File System", ACM Transactions on Computer Systems, vol. 13, No. 3, pp. 274-310, Aug. 1995.

Long, et al., "Swift/RAID: A Distributed RAID System", Computer Systems, vol. 7, No. 3, pp. 333-359, Jun. 1994.

PCT Invitation to Pay Additional Fees dated Oct. 26, 2009 for PCT Pat. No. PCT/US2009/050057 filed on Jul. 9, 2009.

\* cited by examiner

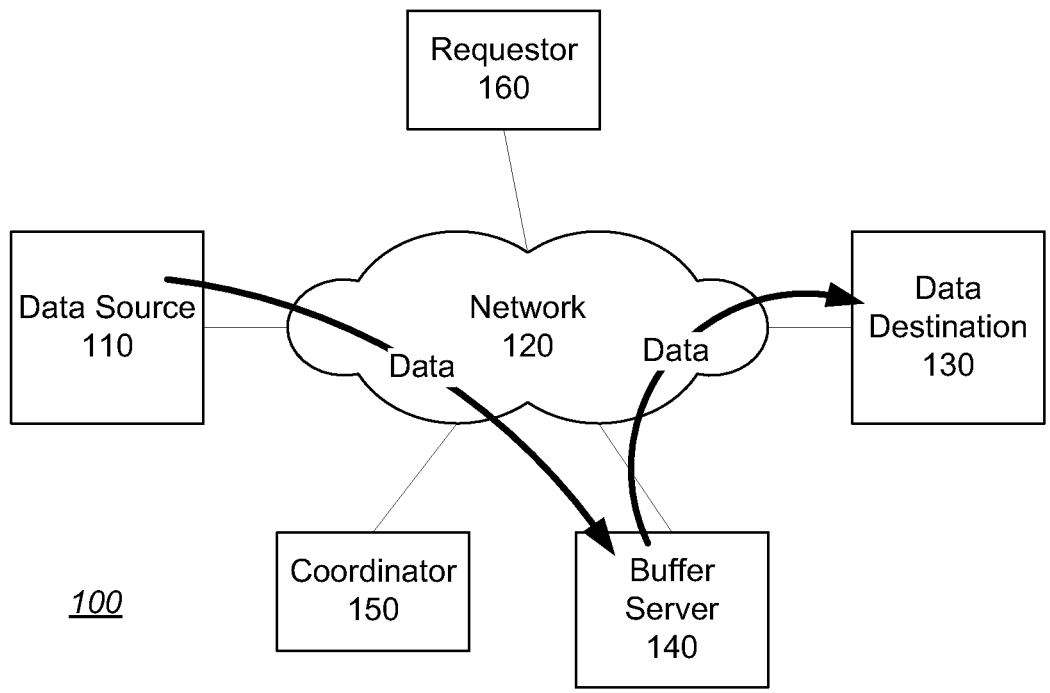
FIG. 1
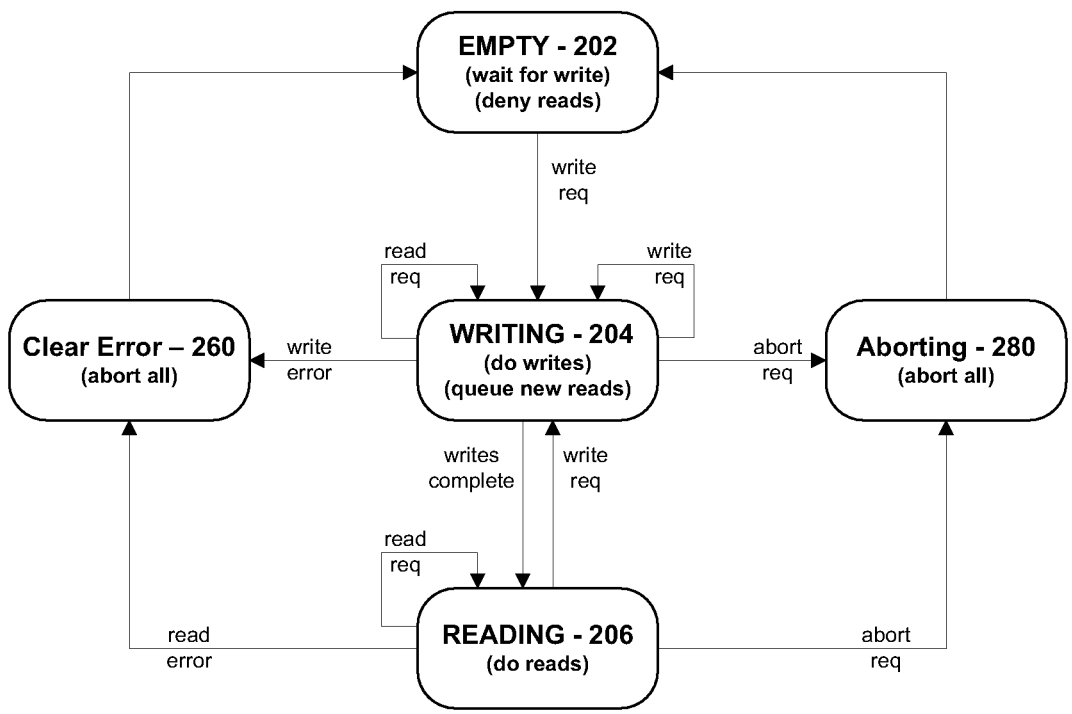
FIG. 2 – Read Buffer

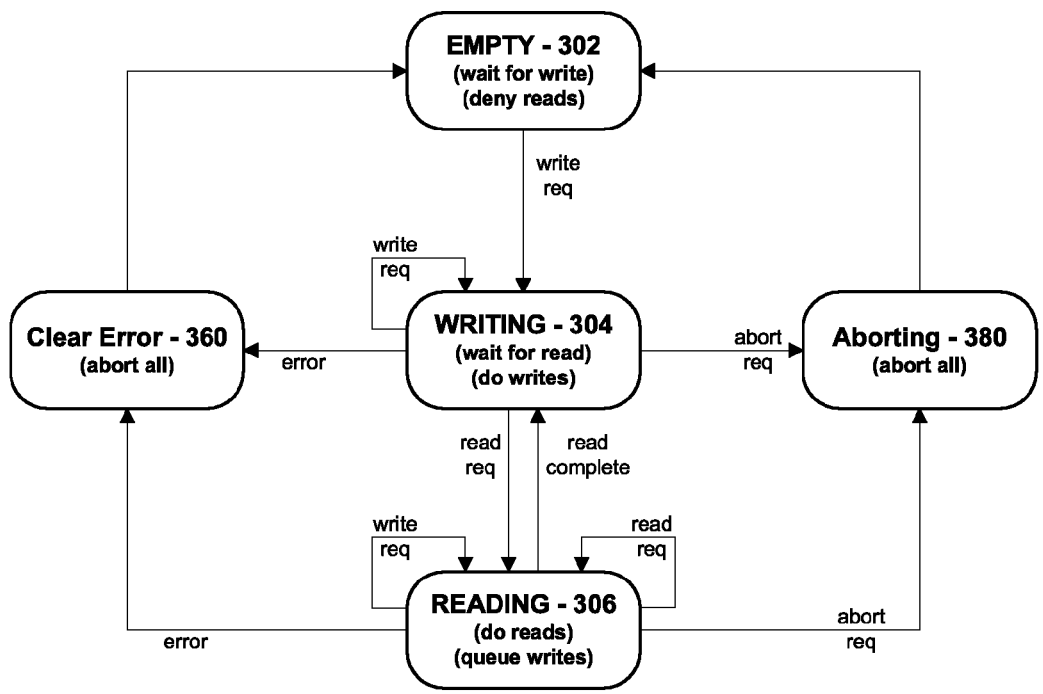
FIG. 3 – Write Buffer
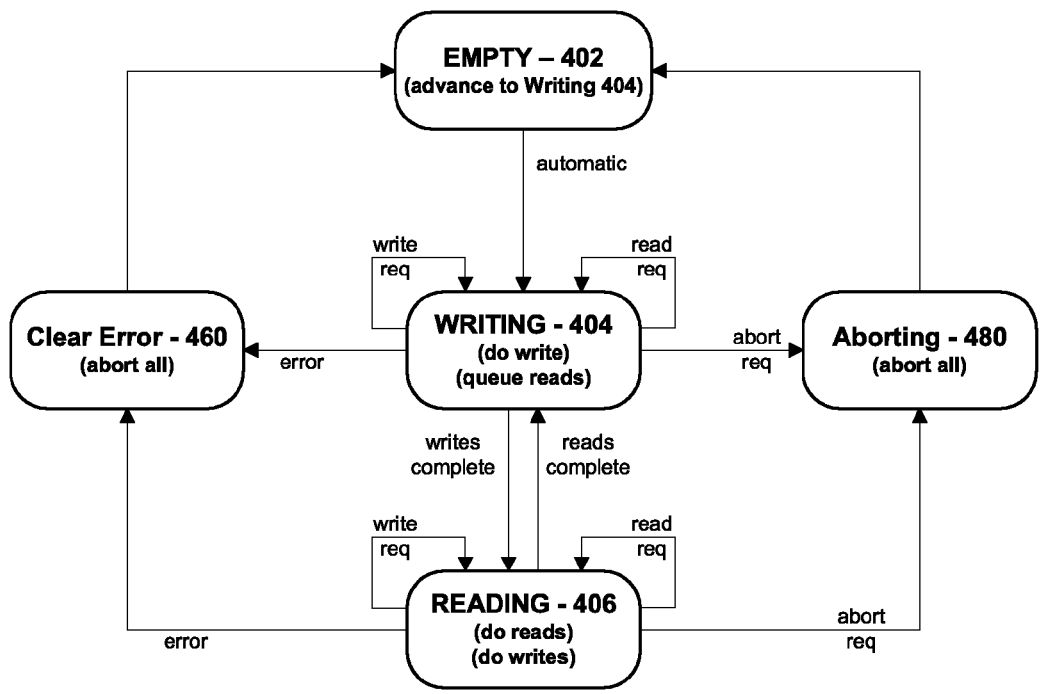
FIG. 4 – Read/Write Buffer

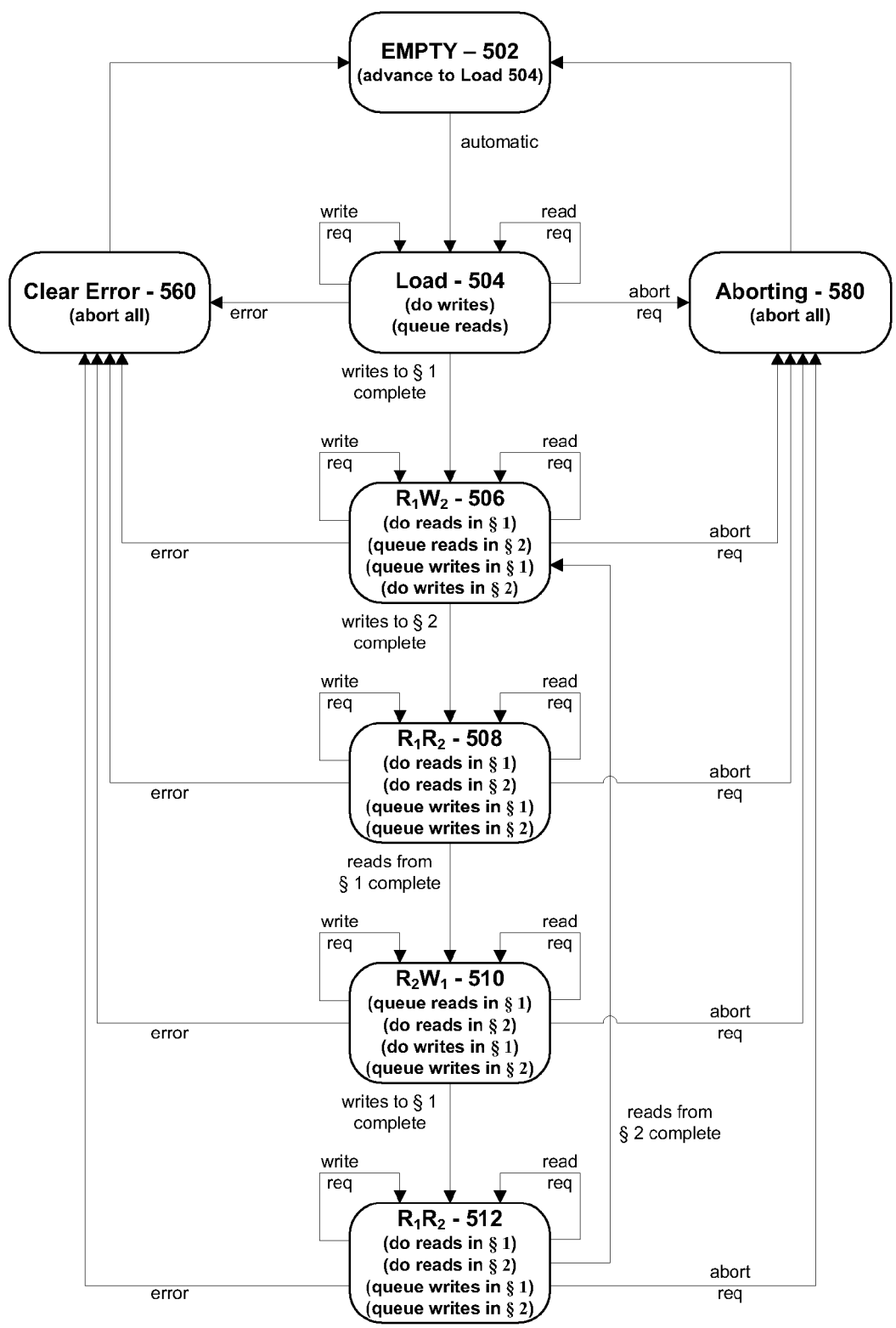
FIG. 5 – Double Buffer

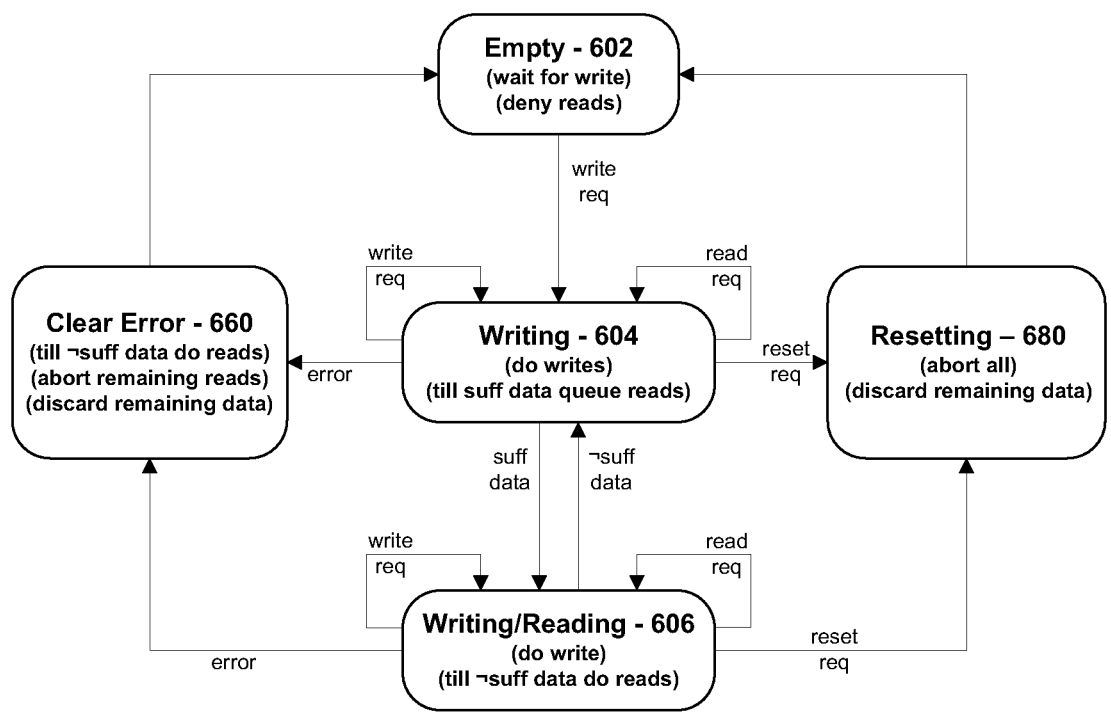
FIG. 6 – FIFO Buffer

DYNAMIC STORAGE RESOURCES

CROSS-REFERENCE TO RELATED APPLICATIONS

This application is related to U.S. patent application Ser. No. 12/170,769, filed Jul. 10, 2008, which is incorporated herein by reference in its entirety.

BACKGROUND

This specification relates to dynamic storage resources.

Some data storage systems include integrated buffers. For example, a storage system may include an integrated buffer (e.g., using high-speed semiconductor memory) and provide an interface that uses the buffer in servicing requests for access to underlying storage devices in the storage system. One example of such a buffer arrangement uses a caching approach in which recently read data from the storage devices is kept in buffers so that repeated requests to read the same data can be serviced from the buffers without requiring repeated reads of the underlying storage device. Similarly, data for write requests may use such a buffer. Furthermore, the system may operate according to a semantic model which allows reordering of some requests, such as reordering read requests for a same block of data but not reordering read and write requests for the same block. Devices may use other fixed buffering approaches and associated semantic models. The buffers may be at various scales, for example, being associated with different disk drives, or being associated with substantially larger intelligent storage systems.

Data storage and access interfaces, such as provided by memory or disk controllers, are often configured to operate according to a semantic model that permits the requester to make certain assumptions regarding how requests made through the interface will be handled. In general, the semantic model is fixed for a particular interface or device.

One application of storage devices is for storing and providing access to digital content, such as digital multimedia content. For example, movies can be stored on storage devices for retrieval when the movies are provided to viewers of the movies.

SUMMARY

In one aspect, in general, a storage server in a distributed content storage and access system provides a mechanism for dynamically establishing buffers with specified semantic models. For example, the semantic models support distributed control of single buffering and double buffering during a content transfer that makes use of the buffer for intermediate storage.

In another aspect, in general, a method includes examining characteristics associated with a desired transfer of data, such as a unit of content, and then selecting characteristics of a first storage resource based on results of the examining. The desired transfer of the data is then affected to use the first storage resource element.

Aspects can include one or more of the following features.

Examining the characteristics associated with the desired transfer includes examining characteristics of the unit of content.

Examining the characteristics associated with the desired transfer includes examining at least one of characteristics of the unit of content, desired communication characteristics of the transfer, and a location of a source and/or a destination of the desired transfer.

Selecting characteristics of a first storage resource element includes selecting from amongst a set of predefined storage resource element types. In some instances, the selecting is done according to semantic models associated with the resource elements. In some instances, the selecting is by a buffer type, which may include a type of buffer semantics.

Selecting characteristics of a first storage resource element includes selecting parameters for the first storage resource element. For instance, selecting parameters for the first storage element includes selecting a size of the first storage element.

Affecting the desired transfer of the unit of content using the first storage resource element includes passing data from a source of the desired transfer to the first storage resource element and passing data from said first element to a destination of the desired transfer.

The method includes requesting forming of the first storage resource element according to the selected characteristics.

The method includes providing instructions to transfer data from a source of the desired transfer to a destination of the desired transfer using the first storage resource element.

In another aspect, in general, a method includes receiving a selection of a first storage resource element according to a selection of a semantic model associated with the storage resource element. The first storage resource element is then formed. Instructions to affect a desired transfer of a unit of content using the formed first storage element are then received.

Aspects can include one or more of the following features.

The method includes providing an address for the formed first storage element.

Receiving the instructions to affect the desired transfer includes receiving instructions specifying the address of the formed first storage element.

Forming the first storage element includes forming a buffer storage element according to the selection of the semantic model.

In another aspect, in general, a distributed storage and access system includes multiple storage servers and communication links coupling the storage servers. The storage servers include a first storage server that is configured to establish a first storage resource according to a selection of a semantic model for said storage resource. Each of the storage servers includes an interface for accepting data transfer instructions according to a common protocol. These instructions identify endpoints of the data transfers according to a common naming approach for storage resources.

Aspects can include one or more of the following features.

The first storage server includes an interface for accepting a data transfer instruction according to the common protocol identifying the established first storage resource according to the common naming approach.

The first storage resource includes a buffer.

In another aspect, in general, a storage server includes a first data storage device, a controller, a second storage device, and an interface for accepting data transfer requests. The interface is configured to accept data transfer requests including (a) requests for transfer of data between the first storage device and the second storage device, and (b) requests for transfer data between the second storage device and a location external to the server. The interface may be further configured to accept data transfer requests including (c) requests for transfer data between the first storage device and a location external to the server.

Aspects can include one or more of the following features.

The first storage device includes a persistent storage device and the second storage device includes a volatile storage device.

The interface is further configured to accept requests to establish storage elements in the second storage device.

The interface is further configured to accept characteristics of storage elements in the second storage.

In another aspect, in general, a distributed content storage and access system includes storage resources that implement semantic models that permit distributed control of transfers of content via intermediary storage devices. For example, a request to pass data via an intermediary buffer does not necessarily require further control of the writing and reading of the buffer during the requested transfer.

Aspects can include one or more of the following advantages.

Implementation of particular semantic models for the intermediate buffers enables distributed control of the writing and reading of the buffers without necessarily requiring a party requesting a data transfer via the buffer to maintain detail control of the transfers. For example, tight synchronization between the requester and a server hosting the buffer may be avoided.

Providing selectable semantic models for the intermediate buffers can provide flexibility for the requesters of content transfers, thereby, allowing the requestors to select buffer semantics that are appropriate to application or infrastructure constraints.

Providing explicit control of the buffer characteristics, such as type (e.g., semantic model), size, and location, and more particularly allowing control of the buffer characteristics on a finer grain than according to an entire storage device or system, can greatly improve performance over a scenario in which a fixed type of buffer is used without substantial control of the buffer characteristics.

One example of this type of advantage occurs when access to data stored in a storage resource (e.g., stored on a disk or on an array of disks) includes different types of data. For example, some data may include relatively long parts (e.g., digitized movies) that are accessed sequentially, but that may not experience frequent repeated accesses, while other data may include relatively short parts (e.g., digitized advertisements) that are accessed repeatedly. An appropriate buffering arrangement for the sequentially accessed long parts may be a double-buffering approach, potentially using larger transfer sizes from the storage device to the buffer than are used from the buffer to a client device. An appropriate approach for the relatively short parts may involve use of a pool of buffers, which are re-used in a least recently used (LRU) approach. Furthermore, the characteristics of the buffers may depend on the characteristics of particular transfers. For example, the length, data rate, channel characteristics to the client device (e.g., rate jitter), buffer characteristics at the client device, may all factor in a decision on the type of buffer approach and specific parameters of the buffer for the particular transfer.

Another example of this type of advantage occurs when it may be appropriate to select a location for a buffer based on its geographic or network topological location. As one example, it may be appropriate to use one location of buffers for transfers to particular client devices (i.e., those connected to a particular access network) and another location of buffers for transfers to other client devices. In some examples, these buffers may have multiple ports (e.g., network connections) which are specifically addressed with different ports providing connections to particular storage devices and particular client devices.

In another example of an advantage of explicit buffering, a chain of buffers (or other topology, such as a tree with a root associated with a client and leaves associated with storage devices) may be established for a transfer of data to a particular client. For example, some of the buffers may serve a function of aggregating and/or ordering data for transmission toward the client.

An advantage of having a preconfigured set of types of buffers, which can be instantiated with specific parameters or allocated from a pool, is that a requester of a transfer between a storage system and another data source or destination can also select the appropriate type of buffer for the particular transfer. The selection may be dependent on higher-level logic such a monitor workload and device and communication link characteristics.

Another advantage relates to the use of nested data transfer requests. For example, a first client may request that a coordinator transfer data from a source to a destination. The coordination may take the characteristics of the request, select (e.g., instantiate or allocate) an appropriate buffer (type, location, size, etc.) and recursively issue further requests acting as a second nested client to affect transfers from the source to the buffer and from the buffer to the destination. In this way, the logic of buffer selection and use may be hidden from the original requestor, but still selected on the basis of overall characteristics of the request.

Another advantage may include use of hardware architectures that are presently used, but providing a different access protocol. For example, a system with a disk drive, controller, and buffer may be reconfigured to allow direct addressing of the disk drive and/or explicit addressing of the buffer attached to the controller, with the controller being configured to pass data either directly between the disk drive (or with minimal buffering) and an external interface, between the disk drive and the integrated buffer, and between the buffer and the external interface. The controller could also be configured to provide the function of establishing the individual buffers for various types and specific parameters using the overall buffer storage in the integrated device.

Another advantage is that the explicit buffers and storage devices may be integrated in an overall system, for example, as a network attached storage device or an intelligent storage system, while providing selection of different buffer types for different types of transfers.

An advantage of providing a uniform address and access protocol for storage devices and buffers, for example, using an HTTP-based protocol with URI-based specification of buffer address and storage device addresses simplifies deployment and modification of complex systems.

Other features and advantages of the invention are apparent from the following description, and from the claims.

DESCRIPTION OF DRAWINGS

FIG. 1 is a block diagram of a system.
FIG. 2 is a state diagram of a read buffer.
FIG. 3 is a state diagram of a write buffer.
FIG. 4 is a state diagram of a read/write buffer.
FIG. 5 is a state diagram of a double buffer.
FIG. 6 is a state diagram of a FIFO buffer.

DESCRIPTION

Figure 7:
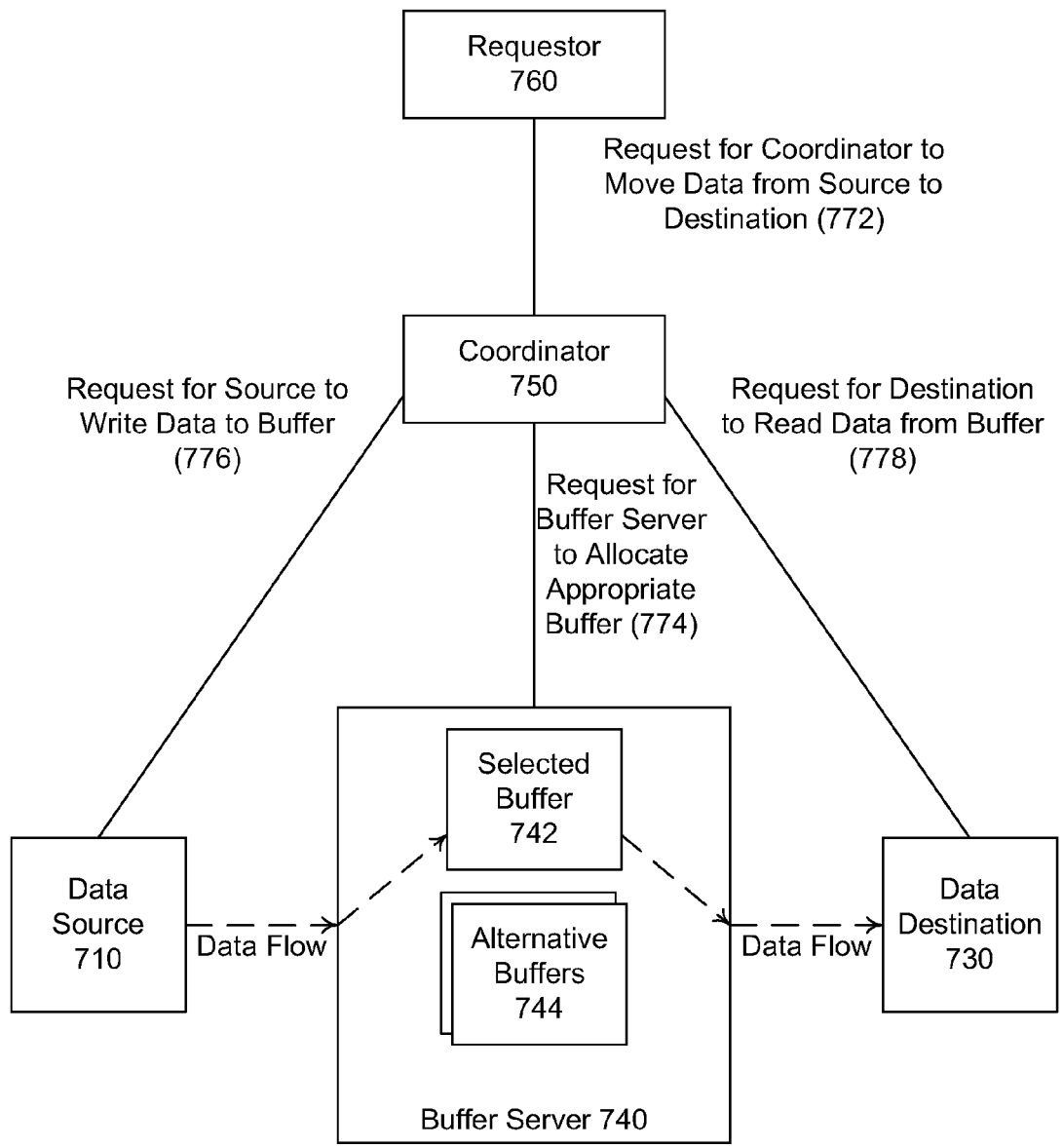
FIG. 7 is a block diagram of a system.

U.S. patent application Ser. No. 12/170,769, describes aspects of a system for content storage and delivery. As discussed in that application, in some embodiments, such a system includes a number of nodes of a distributed system that provide or interface to storage resources. For example, these nodes provide storage functions for maintaining digital content either in a persistent, or in a transient manner during transfer of the content.

The "Network Storage" application, in general, includes description of an approach to accessing storage resources using a protocol involving requests by a first party (a "requester") that are received and coordinated by a second party (a "coordinator") to move data from a third party (a "data source") to a fourth party (a "data destination"). In general, combinations of the first, second, third and fourth parties may be the same party acting in different capacities. In general, the requests described in the "Network Storage" application do not necessarily rely on storage resources with advanced semantic models.

In some embodiments, semantic buffers, which are a subclass of a broader concept of semantic storage resources, are used. These buffers are essentially network accessible resources that may constrain as well as enhance the protocol. For example, one can define a buffer resource to have specific methods that can be invoked through the access protocol that regulates the behavior of the buffer resource.

As used in this application, the terms semantic constraints or semantic model relate to constraints on handling of requests based on the content of the requests. For example, the handling may relate to whether requests are accepted or rejected, and on ordering constraints on when the requests are actually handled. For example, in many of the examples of requests to storage resources described in the "Network Storage" application, little if any constraints are applied to whether requests are accepted (given that they are well formed and are semantically meaningful, for example, referring to known storage resources) or the order in which the requests are handled.

In some versions of a content storage and access system, a semantic constraint may impose a constraint on the ordering of handling of requests made to a storage resource based on the ordering of the receipt of the requests. One example of such a constraint is a requirement that a request to write content at a location in a storage device must complete before subsequently received requests to read content from that location are handled. Such a constraint can simplify operation of a requester that may issue multiple requests in sequence.

In some versions of a content storage and access system, semantic constraints are used to provide a way of distributing coordination of multiple related data transfers so that they can be efficiently executed without substantial ongoing synchronization. In some examples, this coordination relates to the use of intermediate storage resources that are essentially used as buffers during the transfer of content from a persistent storage resource to the ultimate destination of the content. The underlying storage technology for such a buffer is largely independent of the semantic model, for example, with either magnetic disk or solid state memory technologies being used. Note that in some examples, the intermediate storage does not have to be implicitly bound to a particular storage device or subsystem and can be directly configured and managed.

Referring to FIG. 1, an example system 100 demonstrates context for a semantically constrained data transfer system. A requester 160 makes one or more request of a coordinator 150 to achieve a transfer between a data source 110 and a data destination 130. For some such requests, the requester 160 makes use of an intermediate storage server 140, which supports a buffer storage resource that implements one or more of the semantic models describe below. In FIG. 1, a common network 120 is shown linking the components of the system. It should be noted that in general, separate networks may be used, for example, with a different network being used to transfer content from the data source 110 to the buffer server 140 than is used for the transfers between the buffer server 140 and the data destination 130. Also note that in some examples, the coordinator also acts as the buffer server.

Some examples in which a requester 160 may choose to use an intermediate buffer server 140 relate to situations in which the communication characteristics (e.g., maximum throughput, latency, jitter, etc.) between the data source and the buffer server are different (e.g., substantially larger or substantially smaller) than those between the buffer server and the data destination.

In some examples, the buffer server includes predefined buffers. For example, as described in the "Network Storage" application, each of these buffers, and more particularly specific ranges of storage locations within the storage buffers, are addressable using a naming scheme in which a buffer address is specified with a universal resource identifier (URI), identifying a unique namespace for the buffer server and the unique resource address within that namespace. More information about URIs is available in *Uniform Resource Identifier (URI): Generic Syntax*, Berners-Lee et al., Internet Engineering Task Force Standard 66, Network Working Group RFC 3986, January 2005. A buffer may also be tied to a session such that when the session terminates, the buffer and any associated resources are released.

In some examples, buffers are dynamically established (e.g., allocated) and released, for example, on an as-needed basis. For example, in addition to data transfer requests from a requester (e.g., directly to the buffer server, or via a coordinator), a requester can send a buffer establishment request, for example, providing a size and a specification of the semantic model to be implemented by the buffer, and in return receive a name of a suitably established storage resource (in this case a buffer). In some examples, requests to instantiate buffers are implicit based on the transfer requests involving the named buffers. The specification of the semantic model of the resource to be established can, in some examples, be formed as a selection from a known set of models (with or without additional parameters) or, in some examples, it can be formed as a detailed specification of the model. In some embodiments, the storage resource exists before the request and is simply assigned to the requester. In some embodiments, the storage resource is created specifically for the requestor and destroyed when released.

A request to establish a buffer can include specification of an allocation or reservation of resource space (for example memory or disk space) and semantic constraints on how that resource space is accessed. Once successfully established, the buffer server returns a unique identifier for the buffer allowing direct, but semantically constrained, accessing of the resource space controlled by the buffer. The process of establishing a buffer can be implemented with a single command or by a series of commands with the client first allocating or reserving the resource space and then requesting the buffer affiliation with that space. Once mapped to a resource space, a buffer can perform address translation and range checking so that the mapped resource space is byte addressable from offset 0 through Buffer-Size minus 1. Resource access through a buffer is restricted to the resource space affiliated with the buffer. Any request that would access resource space outside the range of the buffer is rejected.

The semantic constraints of a buffer constitute a set of rules for how and when the resource space can be accessed. The buffer server enforces these constraints by contextually allowing, queuing, or rejecting requests as the constraints require. An example of a semantic constraint would be a requirement that the first request writing data into the resource space must complete before any requests to read data from the resource space are honored. The read requests could be rejected or queued for delayed processing as determined by the constraint. Semantic constraints reduce the up-front round trip delays that otherwise result from end-to-end synchronization. That is, without the added constraints, a client could coordinate the movement of data into and out of the allocated space by waiting for each transfer into the allocated intermediary resource to complete before sending any commands to read from the allocated intermediary resource, and vice versa.

Different sets of constraints are appropriate for different access patterns. For example, a buffer can be oriented towards a single write followed by multiple read requests, a buffer can be oriented towards multiple write requests followed by single read request, or a buffer can be oriented towards various degrees of concurrent writing and reading. Other usage patterns can also be handled by an appropriately arranged buffer. Some of these examples are detailed here. Note, that as with other Network Storage operations, operations may be recursively transformed into constituent operations. Thus a single write from the client's perspective may get transformed as multiple writes. Multiple writes or reads can get transformed into a respective single write or read.

Basic Buffer

The basic buffer performs no function other than address translation and range checking. Synchronization, in this case, is the sole responsibility of the client.

Read Buffer

FIG. 2 represents the state transitions of a read buffer. Upon creation, the buffer is in empty state 202 where it waits for a request to write data into the buffer (a buffer write request) and denies all requests to read data from the buffer (a buffer read request). Upon receiving a buffer write request, the buffer transitions into writing state 204 where it queues all new buffer read requests until all write requests complete. When the write requests all complete, the buffer transitions to reading state 206 where it processes all buffer read requests until either a buffer write or buffer abort request is received. Upon receiving a write request, the buffer returns to writing state 204, where it stops removing queued read requests and queues any new read requests. This semantic model may require light client side synchronization, e.g., completing all read operations before issuing a write operation. In some implementations a flag is placed in the read queue and the read queue is processed up to the flag. In some implementations multiple read queues are used, where a new queue is used to receive read requests arriving after the write request and the earlier queues continue to be processed. These models may also require light client side synchronization to prevent writing over the data being read. If an error occurs in writing state 204 or reading state 206 the buffer transitions to clear error state 260 and aborts all operations queued or in progress that can be efficiently aborted. The buffer then returns to empty state 202. Upon receiving an abort request, the buffer transitions to aborting state 280 and aborts all operations queued or in progress that can be efficiently aborted. The buffer then returns to empty state 202.

A buffer write request is a write request that specifies the buffer resource as the destination of the data transfer. If the write operation would overflow the buffer, the request is denied.

When multiple write requests are used with a read buffer, the buffer benefits from the use of an explicit operation indicating that the write requests have completed. Implicit detection of write completion is also possible. In some implementations, because operations may be handled asynchronously from the moment they are received by a server, a flush operand may also be used to ensure that the write operation that completes a series of write operations is actually the last operation in the series to be seen by the buffer (as this is the operation that causes the buffer state to change). In some implementations, information in a write request (e.g., the use of HTTP range headers or HTTP extension headers) makes it possible for the buffer to track and detect when all the data that is intended to be written has been written. Implicit detection of write completion is possible under a variety of circumstances, including where the amount of data to be written is known (e.g., indicated in one or more write requests), where the number of write requests anticipated is known (e.g., indicating that a request is number X out of a total of Y), where the buffer space is fully used, or where a write request has not been received within a preset window of time.

A buffer read request is a read request that specifies a buffer resource as the source of the data transfer. If the read operation would read outside the buffer, the request is denied. Buffer read requests received after a write request are blocked (queued) while write operations are in progress. Read requests received before a write request are processed without this protection. The results of a read followed by a write affecting the region of the buffer being read are indeterminate. It is the responsibility of the client that is going to follow read requests with write requests of the same region to either use a more appropriate buffer or to synchronize the operations, for example, by waiting until reads complete before issuing a conflicting write. Detection of read completion may be explicit or implicit using the same techniques suggested with regard to detection of write completion, including, e.g., enumeration of read requests or anticipating that reads are completed when the entire buffer has been read. These techniques for detecting completion of read or write requests can be used with any of the semantic models described here.

Write Buffer

FIG. 3 represents the state transitions of a write buffer. Upon creation, the buffer is in empty state 302 where it waits for a request to write data into the buffer (a buffer write request) and denies all requests to read data from the buffer (a buffer read request). Upon receiving a buffer write request, the buffer transitions into writing state 304 where it performs all write requests received until it receives a read request. When the buffer receives a read request it transitions to reading state 306 where it processes all buffer read requests until the read requests complete or a buffer abort request is received. While in reading state 306, the write buffer queues all write requests. When reads complete the buffer transitions back to writing state 304 and resumes processing write requests. If an error occurs in writing state 304 or reading state 306 the buffer transitions to clear error state 360 and aborts all operations queued or in progress that can be efficiently aborted. The buffer then returns to empty state 302. Upon receiving an abort request, the buffer transitions to aborting state 380 and aborts all operations queued or in progress that can be efficiently aborted. The buffer then returns to empty state 302.

A buffer write request is a write request that specifies the buffer resource as the destination of the data transfer. If the write operation would overflow the buffer, the request is denied. Write requests to a write buffer are blocked (queued) while a read operation is in progress.

A buffer read request is a read request that specifies a buffer resource as the source of the data transfer. If the read operation would read outside the buffer, the request is denied. When multiple read requests are used with a write buffer, the buffer benefits from the use of an operation indicating that the read requests have completed.

The results of a write followed by a read of the region of the buffer being written are indeterminate. It is the responsibility of the client that is going to follow write requests with read requests of the same region to either use a more appropriate buffer or to synchronize the operations, for example, by waiting until writes complete before issuing a conflicting read.

Read/Write Buffer

FIG. 4 represents the state transitions of a read/write buffer. Upon creation, the buffer is in writing state 404. If the buffer is in empty state 402 it advances automatically to writing state 404. In writing state 404 the read/write buffer performs all write requests received until all writes have completed. The buffer may receive an explicit 'write complete' indication or it may determine completion implicitly. Read requests received while in writing state 404 are queued. Upon receiving the last write while in writing state 404 the buffer transitions into reading state 406. In reading state 406 the buffer performs all queued and subsequently received read requests until all reads have completed. The buffer may receive an explicit 'read complete' indication or it may determine completion implicitly. The reads are not necessarily performed in any particular order, though reads received before the 'reads complete' indication are completed and reads received after the 'reads complete' indication are queued. If the implementation binds the 'reads complete' indication to a read request, the read request and 'read complete' indication are processed as though they were received in separate messages with the read request arriving first. Upon receiving the 'reads complete' indication the buffer transitions back into writing state 404.

If an error occurs in writing state 404 or reading state 406 the buffer transitions to clear error state 460 and aborts all operations queued or in progress that can be efficiently aborted. The buffer then returns to empty state 402. Upon receiving an abort request, the buffer transitions to aborting state 480 and aborts all operations queued or in progress that can be efficiently aborted. The buffer then returns to empty state 402.

While the read/write buffer is in reading state 406, it will also continue to perform any write requests it receives, but it will ignore any 'writes complete' indication. That is, the 'writes complete' indication is not queued or recorded. A write request made while the buffer is in reading state 406 may make indeterminate the results of a read request of the region of the buffer being written. It is the responsibility of the client that is going to use write requests without a read complete notification to either use a more appropriate buffer or to synchronize the operations, for example, by waiting until reads complete before issuing a conflicting write.

Double Buffer

FIG. 5 represents the state transitions of an example of a double buffer. The resource managed by a double buffer is split into two sections. These sections can be regions of a single resource or two distinct resources. Upon creation, the double buffer is in load state 504. If the buffer is in empty state 502 it advances automatically to load state 504. In load state 504 the double buffer performs all write requests received until it receives a write complete notification, or implicitly determines write completion, for one of the two sections. For convenience, this is section 1 and the section still being written to is section 2. When the double buffer receives a write complete notification for section 1 in load state 504, it transitions to read-write state 506. In read-write state 506 the double buffer processes all read requests for section 1 and all write requests for section 2. Read requests for section 2 and write requests for section 1 are queued. When the double buffer receives a write complete notification for section 2 in read-write state 506, it transitions to read-read state 508. In read-read state 508 the double buffer processes all read requests and queues all write requests. When the double buffer receives a read complete notification for section 1 in read-read state 508, it transitions to read-write state 510. Read-write state 510 is the same as read-write state 506, operating on opposite sections. When the double buffer receives a write complete notification for section 2 in read-write state 510, it transitions to read-read state 512. Read-read state 512 is the same as read-read state 508 except that it is the receipt of a read complete notification for section 2 that advances the buffer to the next state. When the double buffer receives a read complete notification for section 2 in read-read state 512, it transitions to read-write state 506.

The handling of reads, writes, errors, and aborts (560, 580) is the same as with the read/write buffer (460, 480). The client is responsible for coordinating access via the completion notifications.

N-Buffer

An N-Buffer is the same as a double buffer but with support for N sections.

FIFO Buffer

Referring to FIG. 6, a first in, first out (FIFO) buffer can use semantic constraints to simplify addressing. All write requests to a FIFO buffer pick up from where the previous write request left off. All read requests from a FIFO buffer pick up from where the previous read request left off. A write to a FIFO buffer resource has the effect of writing data to the portion of the buffer immediately following the current valid contents of the buffer. A read from a FIFO buffer resource has the effect of transferring data from the beginning of the buffer and then effectively shifting the remaining valid contents of the buffer forward by the same amount. This shift can be achieved, for example, by updating the buffer's logical to physical address map.

A write to a FIFO buffer for which the buffer would have enough space if the buffer were empty does not need to be rejected. In one implementation, a write that would cause the buffer to overflow because of previously written valid contents, has the effect of first shifting the valid contents of the buffer forward by the amount of the overflow before performing the write. That is, the space can be created by discarding some of the valid data at the front of the buffer. A write to a FIFO buffer that is larger than the buffer is either rejected or truncated, depending on the implementation.

FIG. 6 represents the state transitions of a FIFO buffer. Upon creation, the buffer is in empty state 602 where it waits for a request to write data into the buffer (a buffer write request) and denies all requests to read data from the buffer (a buffer read request). Upon receiving a buffer write request, the buffer transitions into writing state 604 where it performs all write requests received. When the buffer receives a read request for which it has sufficient data, it transitions to writing-reading state 606 where it processes all read requests for as long as there is sufficient data or until a buffer abort request is received. While in writing-reading state 606, the write buffer continues to process all write requests. If a read request arrives before the buffer has sufficient data to satisfy the request, the request is queued. If the buffer is in writing-reading state 606, it transitions back to writing state 604 and queues read requests until there is sufficient data or a until a buffer abort request is received. If an error occurs in writing state 604 or writing-reading state 606 the buffer transitions to clear error state 660 and aborts all operations queued or in progress that can be efficiently aborted. The buffer then returns to empty state 602. Upon receiving an abort request, the buffer transitions to aborting state 680 and aborts all operations queued or in progress that can be efficiently aborted. The buffer then returns to empty state 602.

In some examples that follow the FIFO approach described above, instead of using 2*Size in a double buffer to get concurrency between reads and writes, the FIFO only requires (1+F)*Size, where F is less than 1 and determined by the expected latency of filling and emptying the buffer.

As described, in some exampled, buffers are allocated as needed for particular transfers (i.e., for the transfer of a particular unit of content, such as for a particular movie). Allocation may entail creation of buffers or selection from a pool of available buffers. When the buffer is no longer needed, it is released—either destroying the buffer or restoring it to an available state. The size and type of buffer used in each transfer is determined by the needs of the transaction. The use of a buffer can be mandated by a requesting client or by a coordinator, e.g., in a manner transparent to the client.

Referring to FIG. 7, in a particular example, a requester 760 sends a data transfer request 772 to a coordinator 750. The request 772 is for the coordinator 750 to coordinate a move of data from a source 710 to a destination 730. The coordinator 750 analyzes the request and, in this example, determines that a specific type and location of a buffer is appropriate for the transfer. The coordinator 750 sends a request 774 to a buffer server 740. The request 774 is for the buffer server 740 to allocate an appropriate buffer of the size and type determined to be appropriate for the transfer. In some cases the buffer server 740 may allocate the buffer 742 from among an existing set of alternative buffers 744. In some cases the buffer server 740 may allocate the buffer 742 by allocating space and assigning semantic constraints to the space, creating a new buffer. The coordinator 750 then affects the transfer of the data from the source 710 to the destination 730 via the buffer 742. For example, the coordinator 750 sends a request 776 to the source 710 for the source to write data to the buffer. The coordinator 750 also sends a request 778 to the destination 730 for the destination to read data from the buffer. Note that the semantics of the buffer may coordinate the writes and reads involving the buffer, for example, blocking the reads until the appropriate data is available as a result of corresponding writes. When the transaction is complete the coordinator 750 may send the buffer server 740 a request to release the buffer.

Figure 8:
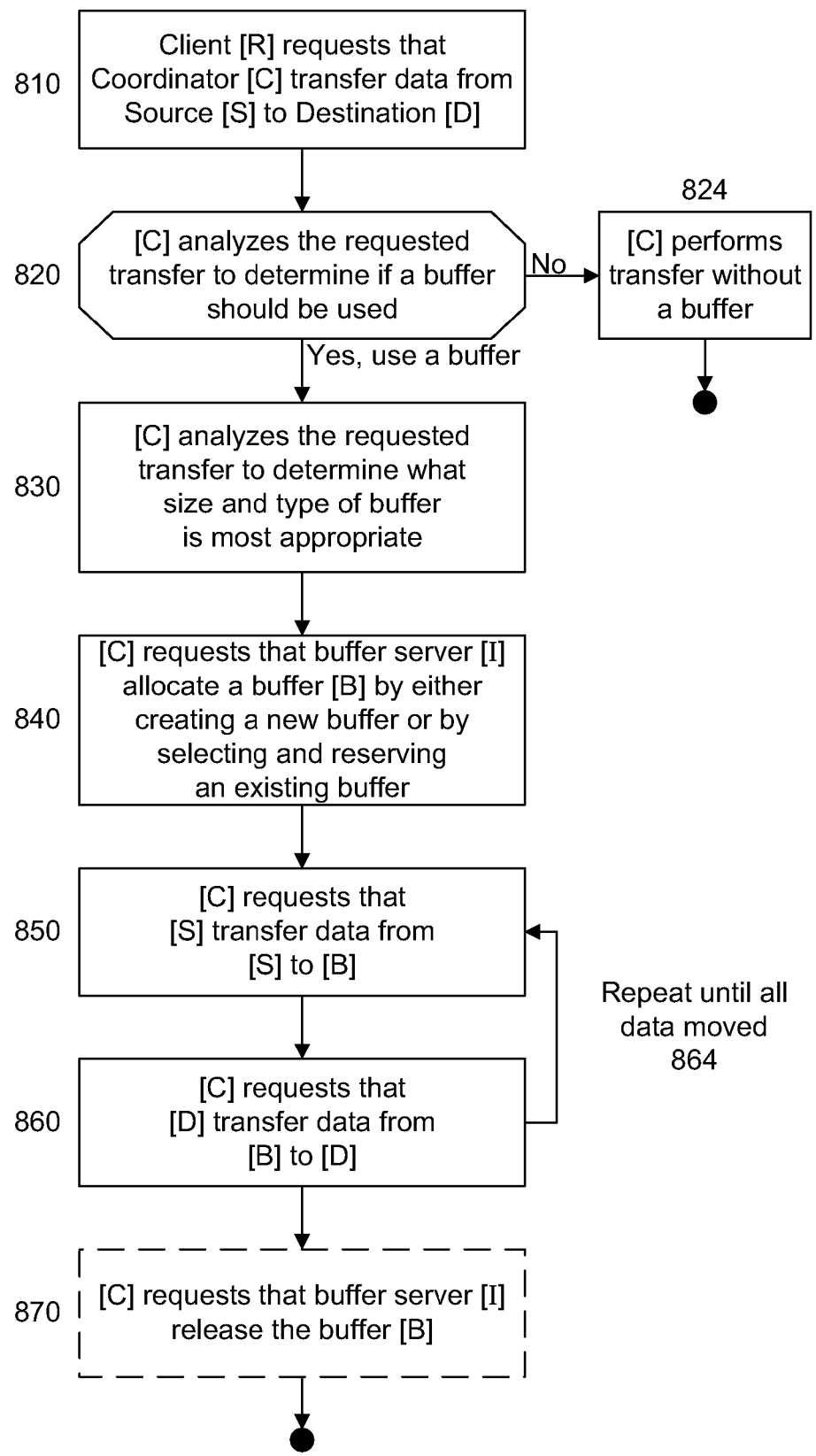
FIG. 8 is a flowchart.

Referring to FIG. 8, a flowchart represents this type of operation. A requester [R] requests that a coordinator [C] transfer data from a source [S] to a destination [D] (810). The coordinator then analyzes the requested transfer to determine if a buffer should be used (820). If no buffer is needed, the coordinator performs the transfer without a buffer (824). If a buffer should be used, the coordinator analyzes the requested transfer to determine what size and type of buffer is most appropriate (830). The coordinator then requests that the intermediary buffer server [I] allocate a buffer [B] (840). The buffer server may allocate the buffer by either creating a new buffer or by selecting and reserving an existing buffer. The coordinator then requests that the source transfer data from the source to the buffer (850). With the data now in the buffer, the coordinator then requests that the data destination transfer the data from the buffer to the destination (860). The buffer may be smaller than the total size of the data to be moved. The coordinator may repeat (864) the process of moving data from the source to the buffer (850) and from the buffer to the destination (860) until all of the data is moved. In some cases the coordinator then requests that the buffer server release the buffer (870).

In some examples, the client requests allocation of the buffer and then treats it as a storage resource for future transactions. For example, the client may expect that there will be several destinations for the data and wishes to use a buffer as a staging area. The source is read into the buffer once and then the various destinations receive the data from the buffer, reducing load on the source and on network connections to the source.

Method steps of the system can be performed by one or more programmable processors executing a computer program to perform functions of the system by operating on input data and generating output. Method steps can also be performed by, and apparatus of the system can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

It is to be understood that the foregoing description is intended to illustrate and not to limit the scope of the system, which is defined by the scope of the appended claims. Other embodiments are within the scope of the following claims.

What is claimed is:

1. A method comprising:
examining, by one or more network devices, characteristics associated with a transfer of data;
selecting, based on the examining and by the one or more network devices, a set of characteristics of a write buffer that buffers requests, associated with the data, during the transfer,
the set of characteristics including a plurality of rules regarding how the write buffer prioritizes read requests, that are associated with the transfer, with respect to write requests, that are associated with the transfer, the plurality of rules causing the write buffer to:
enter an empty state upon creation of the write buffer, in which the write buffer waits for a write request and denies all read requests received while waiting for the write request,
enter a write state upon receiving a write request while the write buffer is in the empty state, in which the write buffer handles write requests, and
enter a read state when a read request is received while the write buffer is in the write state, in which the write buffer handles all received read requests and queues incoming write requests; and providing, by the one or more network devices, the selected set of characteristics to one or more devices that control the write buffer.

2. The method of claim 1, where, when examining the characteristics associated with the transfer, the method comprises:

examining characteristics of one or more units of the data.

3. The method of claim 1, where, when examining the characteristics associated with the transfer, the method comprises:

examining at least one of:
characteristics of one or more units of the data,
desired communication characteristics of the transfer,
a location of a source, or
a destination of the transfer.

4. The method of claim 1, where, when selecting the set of characteristics, the method comprises:

selecting a set of semantic constraints for the write buffer.

5. The method of claim 1, further comprising:

selecting a size of the write buffer based on the characteristics associated with the transfer.

6. The method of claim 1, further comprising:

passing data from a source of the transfer to the write buffer; and passing data from the write buffer to a destination of the transfer.

7. The method of claim 1, further comprising:

determining whether the write buffer, that matches the selected set of characteristics, exists; and requesting formation of the write buffer according to the selected characteristics when the write buffer does not exist.

8. The method of claim 1, where the plurality of rules further cause the write buffer to:

re-enter the write state upon receiving a write request while the write buffer is in the read state.

9. A method comprising:

receiving, by one or more network devices, a selection of a write buffer according to a selection of a semantic model associated with the write buffer, the semantic model including a plurality of rules regarding how the write buffer prioritizes read requests, that are associated with a transfer of data, with respect to write requests, that are associated with the transfer of data, the plurality of rules causing the write buffer to:

enter an empty state upon creation of the write buffer, in which the write buffer waits for a write request and denies all read requests received while waiting for the write request, enter a write state upon receiving a write request while the write buffer is in the empty state, in which the write buffer handles write requests, and enter a read state when a read request is received while the write buffer is in the write state, in which the write buffer handles all received read requests and queues incoming write requests; and forming, by the one or more network devices, the write buffer based on the plurality of rules;

receiving, by the one or more network devices, instructions to transfer the data using the formed write buffer.

10. The method of claim 9, further comprising:

providing an address for the formed write buffer.

11. The method of claim 10, where, when receiving the instructions to affect the transfer, the method comprises:

receiving instructions specifying the address of the formed write buffer.

12. The method of claim 9, where, when forming the write buffer, the method comprises:

forming a buffer storage element according to the selection of the semantic model.

13. The method of claim 9, where the plurality of rules further cause the write buffer to:

re-enter the write state when all read requests are handled.

14. A non-transitory computer-readable medium storing instructions the instructions comprising:

one or more instructions which, when executed by at least one processor, cause the at least one processor to:

examine characteristics associated with a transfer of data;

select, based on the examining, a set of characteristics of a write buffer that buffers requests, associated with the data, during the transfer, the set of characteristics including a plurality of rules regarding how the write buffer prioritizes read requests, that are associated with the transfer, with respect to write requests, that are associated with the transfer, the plurality of rules causing the write buffer to:

enter an empty state upon creation of the write buffer, in which the write buffer waits for a write request and denies all read requests received while waiting for the write request, enter a write state upon receiving a write request while the write buffer is in the empty state, in which the write buffer handles write requests, and enter a read state when no write requests remain to be handled and when at least one read request is queued, in which the write buffer handles queued read requests and queues read and write requests received while handling queued read requests; and provide the selected set of characteristics to one or more devices that control the write buffer.

15. The non-transitory computer-readable medium of claim 14, where the one or more instructions to examine the characteristics associated with the transfer comprise:

one or more instructions to examine characteristics of one or more units of the data.

16. The non-transitory computer-readable medium of claim 14, where the one or more instructions to examine the characteristics associated with the transfer examine at least one of:

characteristics of one or more units of the data,
desired communication characteristics of the transfer,
a location of a source, or
a destination of the transfer.

17. The non-transitory computer-readable medium of claim 14, where the one or more instructions to select the set of characteristics comprise:

one or more instructions to select a set of semantic constraints for the write buffer.

18. The non-transitory computer-readable medium of claim 14, where the plurality of rules further cause the write buffer to:

re-enter the write state when the write buffer is in the read state and no more read requests remain to be handled.

* * * * *